United States Patent [19]

Numata

[11] 4,336,481

[45] Jun. 22, 1982

[54] METHOD OF AND APPARATUS FOR AUTOMATIC ELECTRONIC FLASH LAMP CONTROL

[75] Inventor: Saburo Numata, Omiya, Japan

[73] Assignee: Fuji Photo Optical Co., Ltd., Saitama, Japan

[21] Appl. No.: 201,124

[22] Filed: Oct. 27, 1980

[30] Foreign Application Priority Data

Oct. 26, 1979 [JP] Japan .............................. 54-137587

[51] Int. Cl.³ ........................................... H05B 41/32
[52] U.S. Cl. ............................... 315/241 P; 315/340; 354/128; 354/145
[58] Field of Search ............... 315/241 P, 240, 245, 315/340; 354/128, 139, 145, 149; 362/5

[56] References Cited

U.S. PATENT DOCUMENTS 3,716,752  2/1973  Iwata .......................... 315/241 P X
4,193,677  3/1980  Hasegawa et al. .................. 354/127
4,199,242  4/1980  Hozomizu et al. ................. 354/145
4,256,995  3/1981  Ishida .............................. 315/241 P

FOREIGN PATENT DOCUMENTS 2610026  9/1977  Fed. Rep. of Germany ...... 354/145

Primary Examiner—Eugene R. LaRoche
Attorney, Agent, or Firm—Young & Thompson

[57] ABSTRACT

The amount of light to be produced in an electronic flash lamp apparatus, which is required to take a picture under proper exposure conditions, is predetermined depending on the object distance, the lens diaphragm aperture and the film speed. The actual amount of light produced in the electronic flash lamp apparatus is given as the integrated voltage of a portion only, of the discharge current that flows through the flash discharge tube. The electronic flash lamp apparatus automatically terminates the flash, when agreement between the predetermined and actual amounts of light is reached.

7 Claims, 1 Drawing Figure

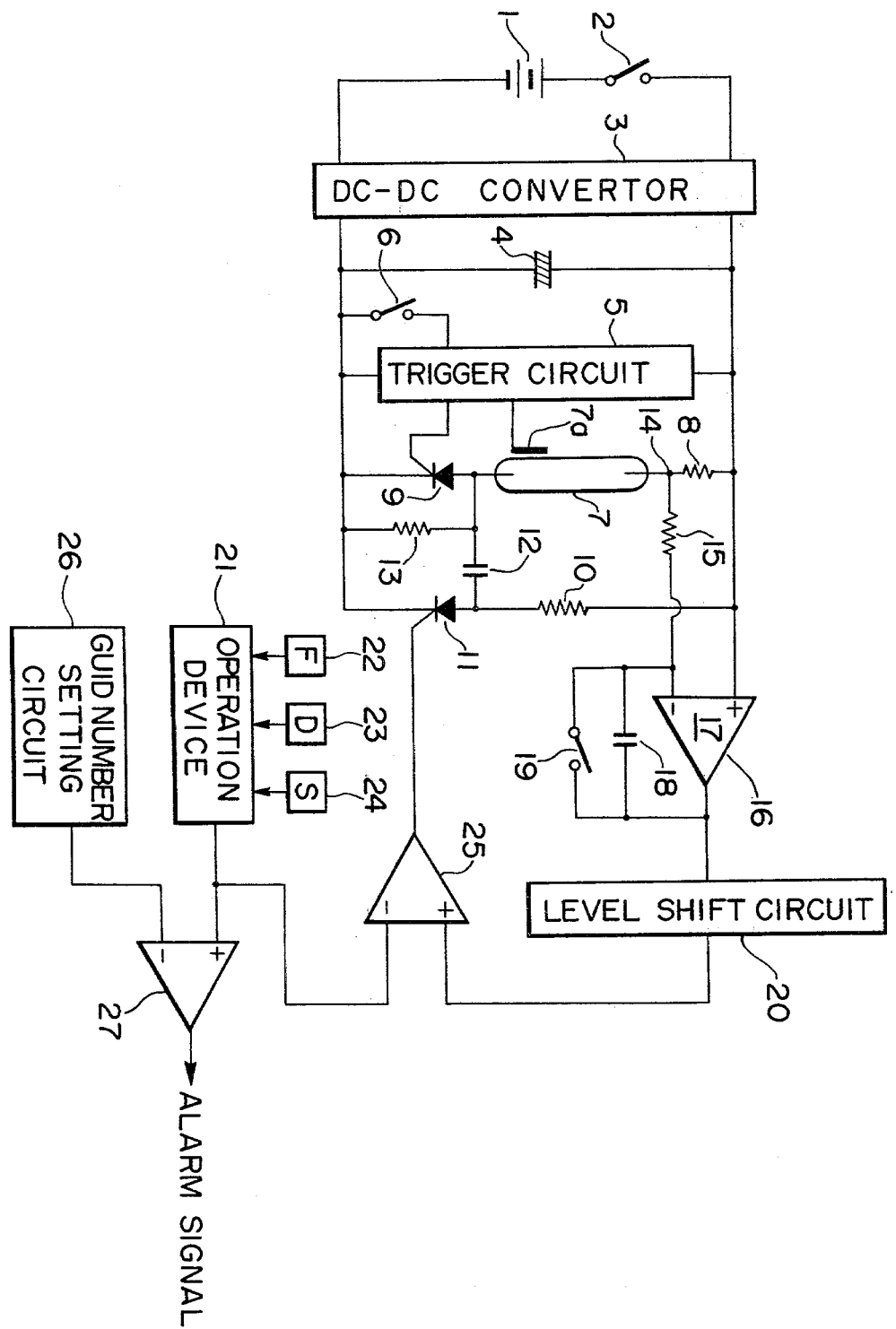

METHOD OF AND APPARATUS FOR AUTOMATIC ELECTRONIC FLASH LAMP CONTROL

BACKGROUND OF THE INVENTION

The present invention relates to a method of and apparatus for automatically controlling an electronic flash lamp to illuminate the object being photographed, in which an electronic flash lamp apparatus automatically terminates the flash when agreement between the predetermined and actual amounts of light is reached, the predetermined amount of light being calculated depending on exposure information, namely, the object distance, the lens diaphragm aperture, etc.

In methods for automatically controlling an electronic flash lamp, it is known to terminate the flash when the actual amount of light reflected from the object being photographed reaches a predetermined amount. But in such a method, there will often be a failure to take a picture due to low light conditions because it is hard to know, prior to taking the picture, whether or not the object distance is in the range in which it is possible to take a flash exposure with success.

In another known method for automatically controlling an electronic flash lamp, the amount of light to be produced is predetermined prior to taking a picture depending on exposure information such as the object distance, the lens diaphragm aperture and film speed. Various types of electronic flash lamp apparatus for automatically controlling the amount of light to be produced are well known. One, for example, is provided with a plurality of capacitors whose capacitances are different from each other, in which the capacitors are selected to predetermine the amount of light to be produced depending on the object distance and so on. Another has only one capacitor with a relatively large capacitance, the terminal voltage of which is controlled to predetermine the amount of light to be produced.

Such methods for predetermining the amount of light to be produced have the advantage that the user can determine prior to the actual taking of pictures whether or not the amount of light required for proper exposures is within the capability of the electronic flash lamp apparatus to be used. On the other hand, the first method requires the provision of many capacitors; whilst in the second method it is difficult to control the terminal voltage at a high level.

OBJECTS OF THE INVENTION

It is accordingly a principal object of the present invention to provide a method of and an apparatus for automatically controlling the amount of light to be produced by a flash lamp.

Another object of the invention is the provision of such electronic flash lamp apparatus in which the amount of light to be produced is controlled with accuracy in spite of its simplicity of construction.

Finally, it is an object of the present invention to provide an electronic flash lamp apparatus in which it is possible to provide an indication of whether or not the distance of the object to be photographed is in the range in which it is possible to make a flash photograph exposure with success.

SUMMARY OF THE INVENTION

The objects of the invention are achieved by providing electronic flash lamp apparatus for use with cameras, in which a flash lamp discharge tube is adapted to terminate the discharge upon coincidence between the actual amount of light produced and the desired amount of light previously calculated depending on the object distance and so on, the actual amount of light being calculated by utilizing a portion only, of the discharge current through the flash lamp discharge tube, based on the fact that the discharge current through the flash lamp discharge tube and the actual amount of light produced thereby correlate well with each other.

Because of the fact that the desired amount of light, which is required to illuminate the object so as to take a picture satisfactorily on the photographic film in the camera, is predetermined as a desired value depending on the object distance, the lens diaphragm aperture and film speed, one can previously determine whether the object distance is in or out of the range enabling the taking of the picture with a flash lamp, by comparing the desired value representing the amount of light to be produced to the guide number particular to the electronic flash apparatus by means of a comparator.

Moreover, it is possible to indicate the conditions to the operator by means of LEDs provided, for example in the finder of the cameras, or an audible signal, either of which can be actuated by the comparator.

BRIEF DESCRIPTION OF THE DRAWING

These and other objects, features and advantages of the present invention will become apparent from a consideration of the following description, taken in connection with the accompanying drawing, in which the sole FIGURE is a block diagram of a preferred embodiment of electronic flash lamp apparatus in accordance with the present invention.

DETAILED DESCRIPTION OF THE INVENTION

Referring now to the drawing in greater detail, a DC-DC converter 3 is actuated when a power switch 2 connected to a power supply such as a battery 1 in series is closed. The DC-DC converter 3 is comprised by an oscillator, a boosting transformer and a rectifier and works in such a way that an alternating current into which a direct current of low voltage is converted, is again converted into a direct current after the voltage is boosted to about 500–600 volts. The direct current with voltage boosted by means of the converter 3 flows into and charges a main capacitor 4.

A trigger circuit 5 is comprised of a trigger capacitor and a boosting transformer and is adapted to discharge the trigger capacitor when a trigger switch 6 (x-contact) is synchronously closed with the shutter on the photographic camera. The secondary voltage is generated through the secondary coil of the transformer owing to the discharge through the trigger capacitor and then it is applied to the trigger electrode 7a to effect the luminous discharge of the flash lamp discharge tube 7.

The flash lamp discharge tube 7 is connected in series with a resistor 8 having a low resistance and a switching element such as a silicon-controlled rectifier 9 for controlling the duration of the flash produced in an electronic photoflash mechanism. The flash lamp-rectifier circuit is connected in parallel with another series circuit which is comprised of a resistor 10 and an isolating silicon-controlled rectifier 11. Between two anodes of the silicon-controlled rectifiers 9 and 11, a capacitor 12 which is charged with the current through the resistors 10 and 13, is connected for commutating the current therethrough. A portion of the discharge current across the resistor 8 is taken out at a point of connection 14 and fed to an integration circuit 16 through a resistor 15. The integration circuit 16 is provided with an operational amplifier 17, an integration capacitor 18 and a switch 19 and works in such a way that the integration capacitor 18 starts to charge the portion of discharge current described above when the switch 19 associated with the trigger switch 6 is opened.

Because the amount of light produced by the flash lamp discharge tube 7 is substantially in proportion to the discharge current through the main capacitor 4, the integrated voltage output from the integration circuit 16, by means of which the portion of discharge current is integrated, will be in proportion to the amount of light produced by the flash lamp discharge tube 7. Now, the integrated voltage, which is the output voltage from the integration circuit 16, gradually rises from the voltage defined as an initial voltage, and is fed to the positive terminal of the operational amplifier 17. Therefore the integration circuit 16 is followed by a level shift circuit 20 in order to drop the integrated voltage by a voltage equal to the initial voltage.

An operation device 21, into which photographing data such as the object distance 23, the lens diaphragm aperture 22 and the film speed 24 are delivered, automatically performs the operation of calculating the amount of light required to illuminate the object to be photographed so as to make a picture satisfactorily on the photographic film. A comparator 25, into which the output voltage of the integration circuit through the level shift circuit 20 is delivered, is adapted to apply an ignition current to the gate of the isolating silicon-controlled rectifier 11 for rendering it conductive upon the close agreement between two voltages obtained.

Furthermore, the integration circuit 16 is adapted to have the same output curve as that of the operation device 21 by properly preadjusting the resistance of the resistor 18 and the capacitance of the capacitor 18.

A guide number setting circuit 26 is provided to set the guide number corresponding to the electronic flash lamp apparatus to be used. The output signal from the guide number setting circuit 26 is compared with the output signal from the operation device 21 by the use of a comparator 27. The object to be photographed will be insufficiently exposed when the amount of light calculated by the operation device 21 exceeds the maximum amount of light that will be produced. In such a case, the comparator 27 will have an output "H" (which means the voltage is at a high level) and will generate an alarm signal, whereupon an alarm lamp (not shown) lights up or flashes, or an electromagnet is actuated to disable the shutter release mechanism of the camera.

Although all of the circuits described above may be arranged within an electronic flash lamp apparatus, it is preferable to build at least the operation device 21, the guide number setting circuit 26 and the comparator 27 into the camera itself, because flash photography can be achieved entirely and automatically by applying electronic signals into which rotational motions of the diaphragm actuating ring and the focussing ring of the lenses are converted through resistors or the like provided within the camera and comprising the operation device 21. Therefore, the information representative of the object distance may be derived from an automatically focussing device within the camera.

The operation of the electronic flash lamp apparatus in accordance with the present invention is as follows:

The data such as the lens diaphragm aperture size 22, the object distance 23 and the film speed 24 are delivered into the operation device 21 by actuating setting dials or operating the camera mechanism. Thus the operation device 21 automatically calculates the desired amount of light to be produced by the electronic flash lamp apparatus so as to take a picture with proper exposure. The signal, which represents the desired amount of light to be produced, from the operation device 21 is delivered to the comparator 27 along with the signal from the guide number setting circuit 26. The comparator 27 produces an alarm signal when the output is "H", that is, when there is close agreement between the signals representative of the amount of light and the guide number (more exactly when the signal for the amount of light is slightly larger than the guide number signal). In that case, an alarm signal actuates, e.g., an LED to light up (or flash) for the indication of wrong conditions. Consequently the operator can confirm, prior to the actual taking of the picture, whether or not the object distance is in the range for successfully taking a picture with a flash.

The DC-DC converter 3 is caused to operate so as to charge the main capacitor 4 and the capacitor 12 when the power switch 2 is closed. After the capacitors 4 and 12 are charged, the switch 19 is opened as the trigger switch 6 is closed simultaneously with the operation of the shutter mechanism caused by releasing the shutter. Upon closing of the trigger switch 6, a high voltage from the trigger circuit 5 is applied to the trigger electrode 7a of the flash discharge tube 7 and simultaneously an ignition current is delivered to the gate of the silicon-controlled rectifier 9. The silicon-controlled rectifier 9 is thus turned on and caused to produce a flash.

As is clear from the description above, the discharge current from the main capacitor 4 is applied to the flash lamp discharge tube 7 through the resistor 8 and then a part of the discharge current from the main capacitor 4 is taken out and is delivered to the integration circuit 16 for integration. The integrated voltage from the integration circuit 16 is delivered to the comparator 25 after the voltage has been reduced by means of the level shift circuit 20.

The comparator 25 serves to compare the output signal from the level shift circuit 20 with the output signal from the operation device 21, that is to say, the comparator 25 compares the actual amount of light produced with the desired amount of light to be produced. When the output becomes "H" in voltage, the comparator 25 causes the isolating silicon-controlled rectifier 11 to turn on. The capacitor 12 is discharged by the turning on of the silicon-controlled rectifier 11 so that the silicon-controlled rectifier 9 is based inversely between the anode and cathode thereof, with the result that the flash lamp discharge tube stops producing light.

Although the invention has been described with reference to a specific embodiment thereof, it will be apparent that various modifications and changes may be made without departing from the scope of the invention, as defined in the appended claims.

What is claimed is:

1. A method for automatically controlling the amount of light produced by an electronic flash lamp discharge apparatus in which a flash lamp discharge tube stops its discharge when the amount of light required to properly expose the object being photographed with success is produced, comprising the steps of presetting the desired amount of light to be produced depending on the object distance, the lens diaphragm aperture and the film speed, said desired amount of light being enough to properly expose said object; measuring the actual amount of light produced in said electronic flash lamp apparatus by measuring a portion of the discharge current of said flash lamp discharge tube for the flash duration; and terminating the discharge of said flash lamp discharge tube when a predetermined relationship between said desired and actual amounts of light is reached.

2. A method as claimed in claim 1, said step of measuring the actual amount of light comprising the steps of integrating said portion of the discharge current through said flash lamp discharge tube; and reducing the voltage level of said integrated voltage.

3. A method as claimed in claim 1, in which the discharge of said flash lamp discharge tube is terminated upon a close agreement between said desired and actual amount of light being reached.

4. In electronic flash lamp apparatus including a flash lamp discharge tube for converting energy of discharge current into a flash of light, means for actuating said flash lamp discharge tube to produce a flash of light, and means for terminating the emission of light from said flash light discharge tube; the improvement comprising means for presetting the desired amount of light to be produced depending on the object distance, the lens diaphragm aperture and the film speed, said desired amount of light being enough to properly expose said object; means for measuring the actual amount of light produced by measuring a portion of the discharge current through said flash lamp discharge tube for the flash duration; and means for producing a signal upon the appearance of which said flash lamp discharge tube emission is terminated when a predetermined relationship between said desired and actual amounts of light is reached.

5. Electronic flash lamp apparatus as claimed in claim 4, said means for measuring the actual amount of light produced comprising means for integrating said portion of discharge current and means for adjusting the level of integrated voltage output to obtain agreement with the level of the desired value.

6. Electronic flash lamp light apparatus as claimed in claim 4, said means for presetting said desired amount of light being built into a camera.

7. In electronic flash lamp apparatus including a flash lamp discharge tube for converting energy of discharge current into a flash of light, means for actuating said flash lamp discharge tube to produce a flash of light, and means for terminating said discharge; the improvement comprising means for presetting the desired amount of light to be produced depending on the object distance, the lens diaphragm aperture and the film speed, said desired amount of light being enough to properly expose said object; means for measuring the actual amount of light produced by measuring a portion of the discharge current through said flash lamp discharge tube for the flash duration; means for producing a signal upon the appearance of which said discharge is terminated when agreement between said desired and actual amount of light is reached; means for setting a guide number particular to said flash apparatus; and means for producing an alarm signal representative of the lack of an adequate amount of light to be produced when a signal from said guide number setting means is lower in voltage than a signal from said means for presetting the desired amount of light to be produced.

* * * * *